United States Patent
Huang (10) Patent No.: US 7,616,460 B2
(45) Date of Patent: Nov. 10, 2009

(54) APPARATUS, SYSTEM, AND METHOD FOR AC BUS LOSS DETECTION AND AC BUS DISCONNECTION FOR ELECTRIC VEHICLES HAVING A HOUSE KEEPING POWER SUPPLY

(75) Inventor: Fengtai Huang, Northville, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 110 days.

(21) Appl. No.: 11/317,658

(22) Filed: Dec. 22, 2005

(65) Prior Publication Data

US 2007/0147097 A1 Jun. 28, 2007

(51) Int. Cl.
*H02H 7/122* (2006.01)

(52) U.S. Cl. .............................. 363/55; 307/64; 361/18; 361/90

(58) Field of Classification Search .................. 307/46, 307/64; 320/101; 323/234, 299; 363/55
See application file for complete search history.

(56) References Cited

U.S. PATENT DOCUMENTS

| | | | |
|---|---|---|---|
| 3,668,514 A | 6/1972 | Peck | 322/28 |
| 4,575,668 A | 3/1986 | Baker | |
| 5,117,178 A * | 5/1992 | Roth | 323/320 |
| 5,483,436 A | 1/1996 | Brown et al. | |
| 5,510,657 A | 4/1996 | Morita | 307/9.1 |
| 5,541,494 A | 7/1996 | Sannomiya et al. | |
| 5,586,613 A | 12/1996 | Ehsani | 180/65.2 |
| 5,670,851 A | 9/1997 | Numazaki | 318/106 |
| RE36,454 E * | 12/1999 | Ball et al. | 322/23 |
| 6,486,571 B1 | 11/2002 | Miller et al. | 307/140 |
| 6,614,134 B1 * | 9/2003 | Davies | 307/64 |
| 6,757,597 B2 | 6/2004 | Yakes et al. | 701/22 |
| RE38,625 E * | 10/2004 | Galm | 307/130 |
| 6,927,988 B2 | 8/2005 | Cheng et al. | 363/56.04 |
| 2004/0012265 A1* | 1/2004 | Fauh et al. | 307/64 |
| 2004/0053082 A1* | 3/2004 | McCluskey et al. | 429/9 |
| 2005/0061561 A1 | 3/2005 | Leonardi et al. | 180/65.1 |
| 2005/0099750 A1* | 5/2005 | Takahashi et al. | 361/92 |
| 2005/0105224 A1* | 5/2005 | Nishi | 361/18 |

(Continued)

FOREIGN PATENT DOCUMENTS

DE 19710319 9/1998

(Continued)

OTHER PUBLICATIONS

Emadi, A., et al., "On the Suitability of Low-voltage (42 V) Electrical Power System for Traction Applications in the Parallel Hybrid Electric Vehicles," *1999 Society of Automotive Engineers, Inc.*, URL= http://www.uta.edu/pecm/SAE2.pdf.

(Continued)

*Primary Examiner*—Edward Tso
*Assistant Examiner*—Arun Williams (57) ABSTRACT

An alternating current (AC) bus malfunction detection and protection module monitors an AC voltage that is provided on a bus by a house keeping power supply of a power system. If the AC voltage on the bus falls below a first level, the module provides a delay before power inverter switching is disabled. If the AC voltage on the bus falls below a second level, the module disables the power inverter switching without delay.

25 Claims, 5 Drawing Sheets

U.S. PATENT DOCUMENTS

| | | | |
|---|---|---|---|
| 2005/0185352 A1* | 8/2005 | Nguyen | 361/90 |
| 2007/0025038 A1* | 2/2007 | Biagi et al. | 361/90 |
| 2007/0064363 A1* | 3/2007 | Nielsen et al. | 361/90 |
| 2008/0116873 A1* | 5/2008 | Takada et al. | 323/299 |

FOREIGN PATENT DOCUMENTS

| | | |
|---|---|---|
| DE | 197 39 410 C1 | 12/1998 |
| GB | 2 314 432 A | 12/1997 |
| JP | 7-67214 | 3/1995 |
| JP | 2002/261780 | 9/2002 |

OTHER PUBLICATIONS

Ludwig, G., et al., "100 kHz Distributed Power System for Aircraft Engine Modularcontrol," *IEEE Xplore*, 2005, p. 374-379, URL= http://ieeexplore.ieee.org/xpl/absprintf.jsp?arnumber=472015.

Luo, S., et al., "A High-frequency AC Distributed Power System with Dual PWM Buses," *IEEE*, p. 63-68, 2003.

Kassakian, J., et al., "Automotive electric systems circa 2005," *IEEE Spectrum*, accessed Aug. 7, 2005, URL= http://lees.mit.edu/public/In_the_News/IEEESpectrum/auto1.htm.

Masrur, M., et al., "Can an AC Electrical System Replace the Present DC System in the Automobile? An Investigative Feasibility Study—Part I: System Architecture," *IEEE Transactions on Vehicular Technology*, 47(3):1036-1041, Aug. 1998.

Masrur, M., et al., "Can an AC Electrical System Replace the Present DC System in the Automobile? An Investigative Feasibility Study—Part II: Comparison and Tradeoffs," *IEEE Transactions on Vehicular technology*, 47(3):1081-1086, Aug. 1998.

International Search Report and Written Opinion dated Oct. 5, 2007.

\* cited by examiner

APPARATUS, SYSTEM, AND METHOD FOR AC BUS LOSS DETECTION AND AC BUS DISCONNECTION FOR ELECTRIC VEHICLES HAVING A HOUSE KEEPING POWER SUPPLY

TECHNICAL FIELD

The present disclosure relates generally to electrical power systems, and in particular but not exclusively, relates to detection of failures or other malfunctions in a power system of an electric vehicle having a house keeping power supply.

BACKGROUND INFORMATION

Electrochemical fuel cell systems are being developed for use as power supplies in a number of applications, such as automobiles, stationary power plants, and other applications. Fuel cells convert reactants (fuel and oxidant) to generate electric power and reaction products (such as water). Such fuel cell systems offer the promise of energy that is essentially pollution free, unlike conventional energy sources such as fossil fuel burning thermal power plants, nuclear reactors, and hydroelectric plants that all raise environmental issues.

In an example implementation, an alternating current (AC) electric machine may be coupled to a direct current (DC) system via a power inverter. When the AC electrical machine is operated as a motor of a vehicle, for instance, the inverter provides power to the AC electric machine by inverting DC power (received from fuel cells or other type of DC power supply, such as solar cells) into AC power, and delivers the AC power to the AC electric machine.

A DC side of the inverter may be coupled to a high voltage (HV) DC bus. Other components are also typically coupled to the HVDC bus, including the fuel cells or other DC power source. The inverter can comprise a plurality of switches, such as six insulated gate bipolar transistors (IGBTs) that comprise pairs of switches for a 3-phase inverter, with a system controller controlling the switching of the transistors and other associated operations of the power system. An example embodiment of an inverter is described in U.S. Pat. No. 6,927,988, entitled "METHOD AND APPARATUS FOR MEASURING FAULT DIAGNOSTICS ON INSULATED GATE BIPOLAR TRANSISTOR CONVERTER CIRCUITS," assigned to the same assignee as the present application, and incorporated herein by reference in its entirety.

A house keeping power supply (HKPS) may be used to provide power and/or electrical signals to the system controller and/or other functional units. In DC implementations, the DC power output from the HKPS is provided to the system controller and to individual electrical functional units of the vehicle through a DC bus. The DC power output of the HKPS is then locally converted to different DC voltage levels as needed by the system controller and/or the functional units. With this DC bus approach, multiple DC/DC converters are used. However, there are a number of drawbacks in using multiple DC/DC converters, including requirements for complex circuitry, increased costs, increased electromagnetic compatibility (EMC) issues, and decreased system reliability.

An alternative implementation is to use a HKPS with an AC bus. That is, the HKPS transforms input DC power to output AC power, and distributes the output AC power to the system controller and/or to functional units of the vehicle via an AC bus.

Failures and other malfunctions of the HKPS need to be detected. Such malfunctions can include, for example, loss of power on the AC bus, abnormally high or abnormally low voltages or current, bus disconnections, or other abnormal condition or state of the AC bus. If the malfunctions are not addressed (such as by disconnecting the HKPS from the power system), then damage to high power devices or other components in the power system may occur due to undefined states or other aggravating factor(s).

BRIEF SUMMARY OF THE INVENTION

According to one aspect, a power system comprises a first power supply to provide power, an inverter coupled to the first power supply to transform the power provided by the first power supply to a form that can be used by an electrical load, a second power supply coupled to a bus to provide a signal on the bus, a switching control unit to operate on the bus signal to obtain a switched signal, an inverter drive unit coupled to the bus to receive the switched signal and coupled to the inverter to provide signals to the inverter to control transformation of the power provided by the first power supply, and a module coupled to the bus to detect a particular condition of the bus, and if the condition is detected, to send a control signal to decouple the inverter drive unit from the bus.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Embodiments of techniques to detect malfunctions or other abnormal conditions in a power system having a house keeping power supply (HKPS) and to protect the power system from the malfunction(s) are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore; the particular features, structures, or characteristics may be combined in any suitable manner in one or more embodiments.

The headings provided herein are for convenience only and do not interpret the scope or meaning of the claimed invention.

As an overview, an embodiment provides a circuit configuration for detection of a malfunction (such as an AC bus loss detection, AC bus disconnection, or other detection of some other abnormal condition) in a power system that includes a house keeping power supply (HKPS). The circuit configuration can provide an AC bus lost signal or other signal in response to the abnormal condition so that appropriate action(s) can be taken to protect the power system from damage.

Figure 1:
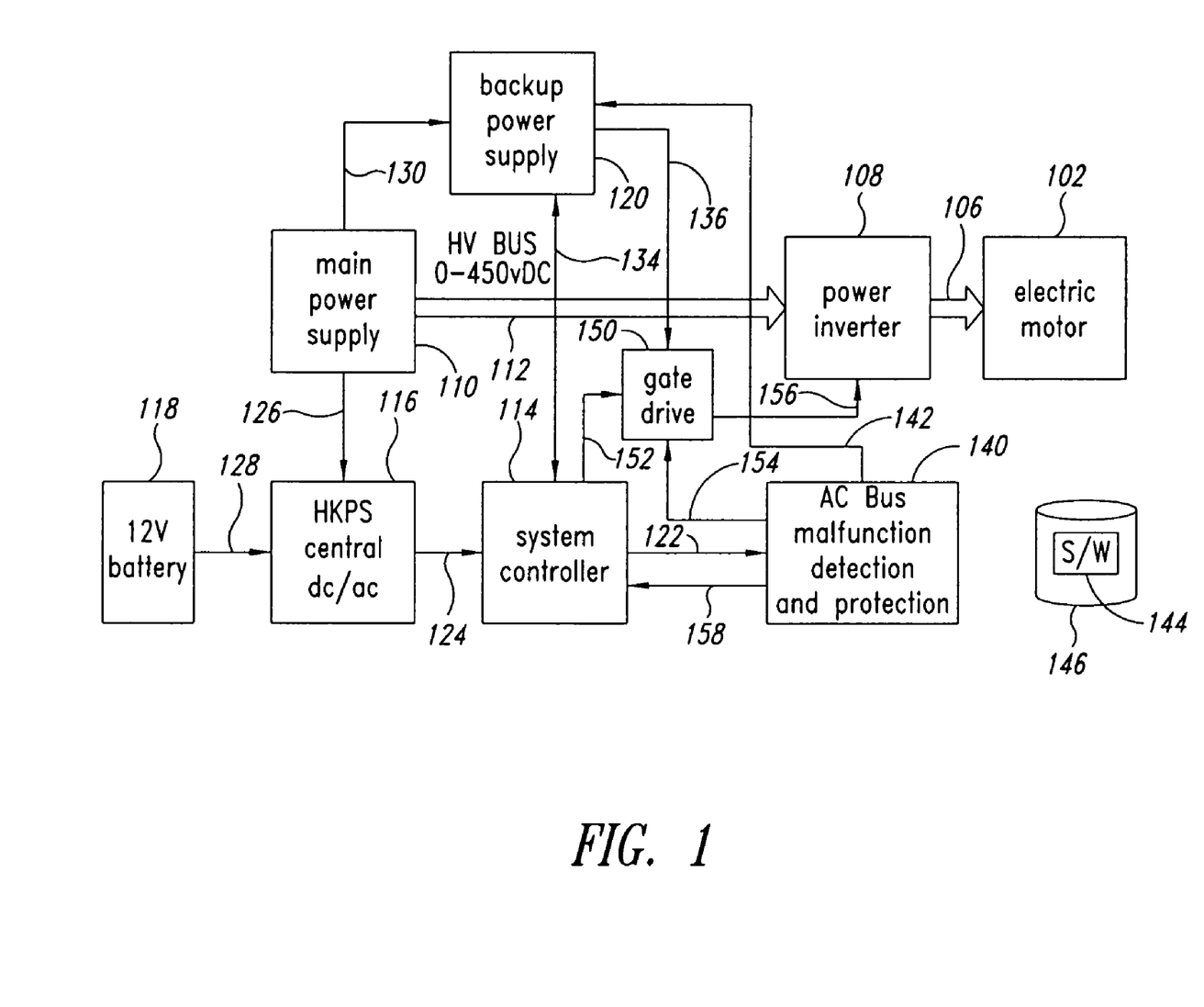
FIG. 1 is a block diagram of an embodiment of a power system having a central house keeping power supply (HKPS) to provide an AC signal to an AC bus and an AC bus malfunction detection and protection module.

FIG. 1 is a block diagram of an embodiment of a power system 100. The power system 100 may provide alternating current (AC) power to an electric motor 102 or other load, via a bus 106. In one example embodiment, the electric motor 102 comprises a motor of a vehicle.

The power system 100 includes, among other components (not shown), a power inverter 108, a main power supply 110, a high voltage direct current (HVDC) bus 112, a system controller 114, a house keeping power supply (HKPS) 116, a battery 118, and a backup power supply 120. The DC side of the inverter 108 and the main power supply 110 are coupled to the HVDC bus 112, which in one example embodiment carries a DC voltage that ranges between 0V and 450V DC. The electric motor 102 is coupled to the AC side of the inverter 108, via the bus 106.

The HKPS 116 supplies power to the system controller 114 via a connection 124. In some embodiments the HKPS 116 may supply power to other functional units via the connection 124 or other connections (not shown). The HKPS 116 typically receives power from the main power supply 110, via a connection 126 at a high voltage input, and transforms the received power to voltage and/or current signals suitable for operating the system controller 114. According to one embodiment, the HKPS 116 operates as a central DC/AC device that transforms DC power from the main power supply 110 into AC power for the system controller 114.

In the event that power is not available to the HKPS 116 from the main power supply 110, the battery 118 may be used to provide backup power to a low voltage input of the HKPS 116, via a connection 128. Additionally, during startup, the HKPS 116 may receive power from the battery 118, via the connection 128, and transform the received power to one or more signal(s) suitable for operating the system controller 114 or other components of the system 100. Once the main power supply 110 is ready for full operation, the HKPS 116 may receive its power from the main power supply 110 rather than from the battery 118.

The output of the HKPS 116 of one embodiment comprises a high frequency AC voltage that is provided to the system controller 114. The system controller 114 in turn provides the AC voltage to an AC bus malfunction detection and protection module 140 via a bus 122. Under normal operating conditions, the AC bus malfunction detection and protection module 140 then provides the AC voltage to an inverter gate drive unit 150 via a bus 154. In an embodiment, the AC voltage on the bus 122 to the inverter gate drive unit 150 comprises an AC signal having a frequency and an amplitude (such as 200 kHz, 15V AC, as a non-limiting example). Therefore, since the signal on the bus 122 is an AC signal, the bus 122 is descriptively referred to as an "AC bus" throughout this disclosure.

In operation, the inverter 108 provides power to the electric motor 102 by inverting direct current (DC) power (received from the main power supply 110 via the HVDC bus 112) into AC power. To cause the inverter 108 to invert the DC power, the system controller 114 provides AC signals on the bus 152 to the inverter gate drive unit 150 so as to control or otherwise command the switching operations of the switches in the inverter 108 via signal lines 156. These switches of the inverter 108 of one embodiment comprise a plurality of transistor devices, such as, but not limited to, field effect transistors (FETs), metal oxide semiconductor field effect transistors (MOSFETs), or insulated gate bipolar transistors (IGBTs), and associated components.

In the event that the AC voltage on the bus 122 is lost, the backup power supply 120 can provide predefined gate voltages to the switches of the inverter 108, via a connection 136. One embodiment of the backup power supply 120 can also monitor the voltage of the HVDC bus 112 via a connection 130. For example, a status signal or some other suitable signal, may be provided over the connection 130 from the main power supply 110 to the backup power supply 120 to indicate the status of the HVDC bus 112. Alternatively or additionally, the backup power supply 120 may include components configured to directly monitor the operating voltage of the HVDC bus 112. Some embodiments of the system 100 may contain components to test the operability of the backup power supply 120 and/or to indicate the operational state of the backup power supply 120 to the system controller 114, such as via a connection 134.

To operate the switching of the inverter 108 and to drive the electric motor 102 reliably, a stable AC bus voltage should be provided on the bus 122. The operation of the inverter gate drive unit 150 with an unstable AC bus voltage, including total loss of AC bus voltage or undesirable changes in AC bus voltage (such as voltage drops or voltage increases), can result in malfunction in the inverter 108 and/or damage to components of the system 100.

Accordingly, an embodiment provides the system 100 with the AC bus malfunction detection and protection module 140. Once the module 140 detects an abnormal condition on the bus 122, the module 140 can decouple or otherwise isolate the AC bus 122 from the inverter gate drive unit 150. One embodiment of the module 140 generates a control signal or indication when the abnormal condition is detected, including an AC bus lost signal. The AC bus lost signal may for example be communicated via signal lines 142 and/or 158. The system 100 is responsive to the AC bus lost signal to determine the appropriate protective action to take.

According to one embodiment, the type of protective action is based on the voltage level of the HVDC bus 112. If the voltage level of the HVDC bus 112 is below a certain level, then all switching command signals from the system controller 114 to the inverter gate drive unit 150 are disabled (via the bus 152). Thus, if there are six switches in the inverter 108, all six switching command signals for these switches are disabled. This disabling action is performed to prevent any switching action to be taken using the residual power remaining in the inverter gate drive unit 150.

If the voltage level of the HVDC bus 112 is above a certain level, then the backup power supply 120 is activated, such as by sending an activation signal via a connection 142 between the module 140 and the backup power supply 120. As a result, the backup power supply 120 will switch ON the upper switches in the inverter 108, and will switch OFF the lower switches in the inverter 108 (or vice versa). Performing this action will prevent an over voltage condition on the HVDC bus 112. In an embodiment, an AC bus lost signal is generated to initiate these protective measures, after a malfunction on the bus 122 is detected by the module 140 and after the bus 122 has been isolated or otherwise disconnected from the inverter gate drive unit 150.

In one embodiment, the system controller 114 can be coupled to a machine-readable storage medium 146 having machine-readable instructions 144 (such as software or other machine-readable instructions) stored thereon that are executable by a processor. As an example, such machine-readable instructions 144 can include software associated with operating the power system 100.

Figure 2:
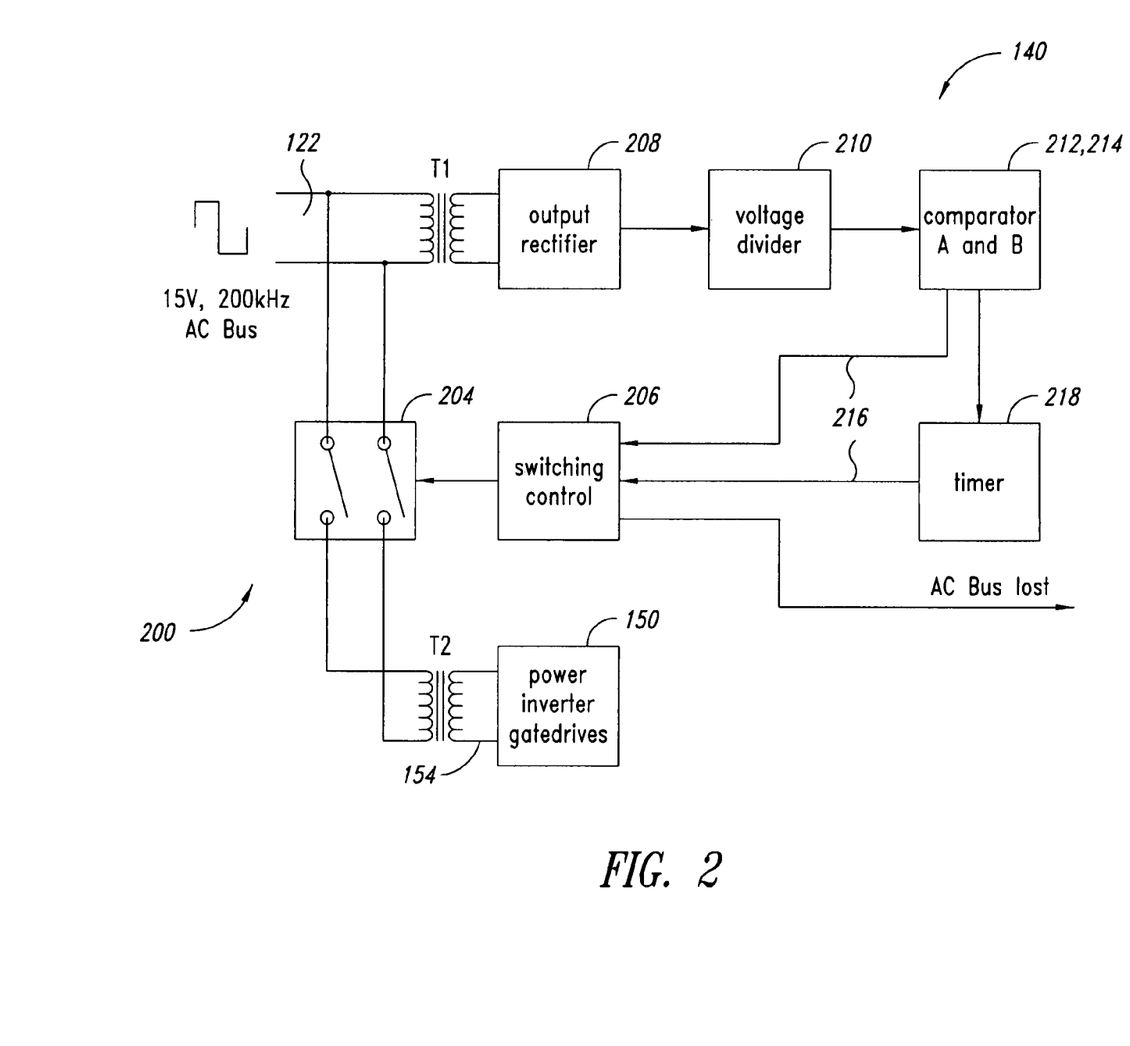
FIG. 2 is a block diagram of an embodiment of the AC bus malfunction detection and protection module of FIG. 1.

FIGS. 2-5 provide additional details pertaining to the detection and protection actions described above. Beginning first in FIG. 2, shown generally at 200 is an embodiment of a subsystem that includes the AC bus malfunction detection and protection module 140. Under normal operating conditions, the AC bus voltage (depicted in non-limiting illustrative manner in FIG. 2 as a square wave signal having a frequency of 200 kHz and an amplitude of 15V) is provided by the system controller 114 to the bus 122 after being received from the HKPS 116. The AC bus voltage on the bus 122 is in turn provided to the inverter gate drive unit 150 via a switching circuit 204, a transformer T2, and the bus 154. The switching circuit 204 is responsive to an output signal of a switching control block 206.

An embodiment of the module 140 measures or otherwise determines the AC voltage on the bus 122 using a transformer T1 having an input terminal coupled to the bus 122, a rectifier 208 coupled to an output terminal of the transformer T1, and a voltage divider 210 coupled to the rectifier 208. Further details pertaining to the operation of the transformer T1, rectifier 208, and voltage divider 210 are provided later below with respect to FIG. 3.

A pair of comparator circuits 212 and 214 (having comparators A and comparator B, respectively) is coupled to receive the output of the voltage divider 210 that represents the measured or otherwise determined AC voltage on the bus 122. According to an embodiment, the comparators 212 and 214 compare the measured AC voltage on the bus 122 with at least one defined reference voltage. An output of the comparator circuits 212 and 214 is provided as an input to the switching control block 206 via a connection 216.

If the measured AC voltage on the bus 122 is below a first voltage level (such as below 80% of a nominal AC voltage on the bus 122), then an activation signal is sent on the connection 216 to activate the switching control block 206 after a predefined time that can be tracked by a timer 218. An example of the predefined time is 10 cycles of the AC voltage on the bus 122.

If the measured AC voltage on the bus 122 is below a second voltage level (such as below 20% of a nominal AC voltage on the bus 122), then the activation signal is sent on the connection 216 to immediately activate the switching control block 206 without having to implement a delay.

Figure 3:
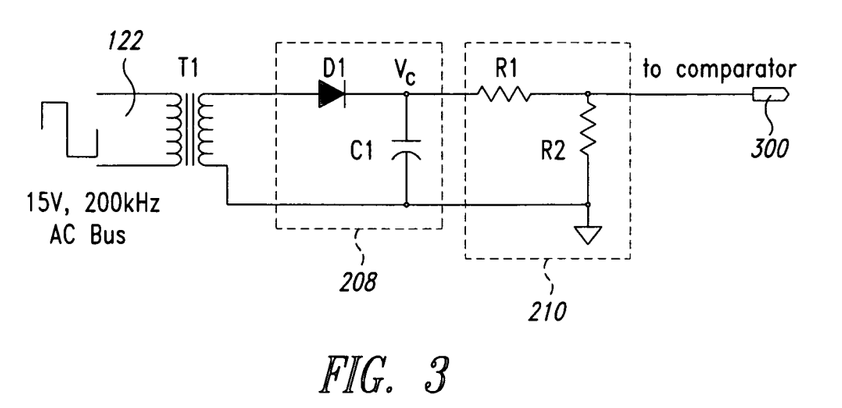
FIG. 3 is a schematic diagram of an embodiment of an AC bus voltage measurement circuit of the module of FIG. 1.

FIG. 3 shows an embodiment of an AC bus voltage determination circuit that includes the rectifier 208 and voltage divider 210 of FIG. 2 in more detail. The transformer T1 of one embodiment comprises a transformer having a 1:1 turns ratio that provides isolation between the bus 122 and the AC bus voltage determination circuit.

The rectifier 208 comprises a diode D1 coupled to the output terminal of the transformer T1 and a capacitor C1 coupled to an output terminal of the diode D1. The diode D1 and the capacitor C1 operate to rectify and filter the AC voltage (such as 15V AC) provided on the bus 122 to a DC voltage (such as 15V DC). The voltage divider 210 of one embodiment comprises resistors R1 and R2 that divides the DC voltage, such as by dividing 15V DC into 10V DC and 5V DC (i.e., a 2:1 voltage division).

According to one embodiment, the values of C1, R1, and R2 are selected such that the voltage $V_c$ across the capacitor C1 should not be discharged to a level below the AC bus lost detection voltage (i.e., below the first voltage level discussed above) at the end of each AC bus cycle. The capacitor discharge voltage is given by:

$$V_c(t)=V_o e^{-t/\tau}$$ Equation (1), where $V_o$ is the initial discharge voltage (e.g., 15V) of the capacitor C1 and τ is the time constant having a value (R1+R2)*C1.

As an example, if the AC bus lost detection voltage (i.e., the first voltage level) is set at 80% of 15V and t=2.5 μs at the end of each bus cycle, then τ will be −2.5/ln(0.8)=11.2 μs based on Equation (1) above. If a 30% safe margin is applied, then τ should be approximately 15 μs. With this value of τ, and if R1 is set at 10 k ohms and R2 is set at 5 k ohms, the value of the capacitor C1 should be 1 nF.

Figure 4:
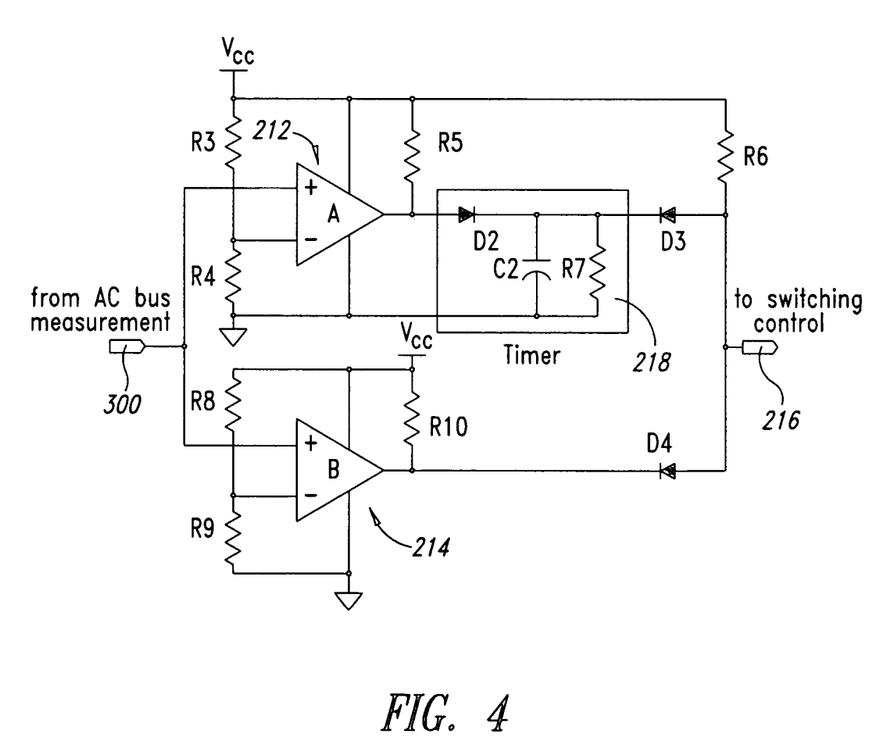
FIG. 4 is a schematic diagram of an embodiment of a comparator and timer circuit of the module of FIG. 1.

The output of the voltage divider 210 (i.e., the voltage across the resistor R2) is provided by a connection 300 to the comparator circuits 212 and 214, respectively. FIG. 4 is a schematic diagram showing embodiments of the comparator circuits 212 and 214 and the timer 218 in more detail.

The comparator circuit 212 comprises a comparator A having a first input terminal coupled to the connection 300 to receive the output voltage of the voltage divider 210, and a second input terminal coupled to a node between a series connection of resistors R3 and R4. The resistors R3 and R4 operate to divide a voltage provided by a voltage supply Vcc. A resistor R5 is coupled between an output terminal of the comparator A and the voltage supply Vcc.

The comparator circuit 214 comprises a comparator B having a first input terminal coupled to the connection 300 receive the output voltage of the voltage divider 210, and a second input terminal coupled to node between a series connection of resistors R8 and R9. The resistors R8 and R9 also operate to divide the voltage provided by the voltage supply Vcc. A resistor R10 is coupled between an output terminal of the comparator B and the voltage supply Vcc.

The timer 218 of one embodiment comprises a diode D2 coupled to the output terminal of the comparator A, and the diode D2 is in turn coupled to a parallel coupling of a capacitor C2 and a resistor R7. A resistor R6 and a diode D3 are coupled between the voltage supply Vcc, and the capacitor C2 and the resistor R7. A diode D4 is coupled between the output terminal of the comparator B and the resistor R6.

As described above in one example embodiment, AC bus lost detection may be implemented at first and second voltage levels: at 80% of the AC bus voltage and at 20% of the AC bus voltage, for example. At 80% of the AC bus voltage, the detection response of the switching control block 206 is controlled by the timer 218, which for instance, may operate based on certain numbers of AC bus cycles. Thus, if the timer is set at 50 μs, the equivalent is 10 AC bus cycles, for the AC voltage on the bus 122 having a frequency 200 kHz.

One purpose of using the timer 218 is to provide a delay so as to avoid transient effects of the AC bus voltage on the AC bus voltage measurement circuit of FIG. 3. The timer 218 need not be used with respect to detection of 20% of the AC bus voltage, where the detection response of the switching control block 206 is immediate.

The comparator circuit 212 is used for AC bus voltage detection at the first voltage level, such as at 80% of the AC bus voltage. Assuming that the nominal voltage level of the AC bus 122 is 15V, then the voltage across the resistor R2 of FIG. 3 is 5V. At 80% of the AC bus voltage (e.g., at 12 V), the voltage across the resistor R2 is 4V. This 4V voltage is provided as the input to the first input terminal of the comparator A.

The voltage divider comprising the resistors R3 and R4 may be set such that the resistor R3 takes 20% of the voltage from the voltage supply Vcc, while the resistor R4 takes 80% of the voltage from the supply voltage Vcc. Assuming that the voltage supply Vcc supplies 5V, then the voltage across the resistor R3 is 1V and the voltage across the resistor R4 is 4V, where the resistor R3 has a value of 10k ohms and the resistor R4 has a value of 40 k ohms.

The comparator circuit 214 is used for AC bus voltage detection at the second voltage level, such as at 20% of the AC bus voltage. Assuming again that the nominal voltage level of the AC bus 122 is 15V, then the voltage across the resistor R2 of FIG. 3 is 5V. At 20% of the AC bus voltage (e.g., at 3 V), the voltage across the resistor R2 is 1V. This 1V voltage is provided as the input to the first input terminal of the comparator B.

The voltage divider comprising the resistors R8 and R9 may be set such that the resistor R8 has a value of 40 k ohms and the resistor R9 has a value of 10 k ohms. Thus, the 5V voltage provided by the voltage supply Vcc is divided into 4V across the resistor R8 and 1V across the resistor R9.

Under normal operation, if the input voltage on the connection 300 (i.e., the voltage across the resistor R2) to the first input terminals of the comparators A and B is higher than their respective thresholds (e.g., 80% and 20%), then the output of both comparators A and B will be high. The capacitor C2 in the timer 218 is therefore charged up to the level of the voltage supply Vcc (e.g., 5V). The output signal on the connection 216 to the switching control block 206 will be high, and the switching control block 206 continues to operate normally.

However, if the input voltage on the connection 300 corresponds to below 80% of the nominal AC bus voltage, but above 20% of the nominal AC bus voltage, then the output of the comparator A will be low. The voltage across the capacitor C2, which has been charged to 5V, discharges through the resistor R7 until a voltage level set by the resistors R7 and R6 is reached. The voltage level set by the resistors R7 and R6 has to be low enough to activate or otherwise initiate a response from the switching control block 206.

In one embodiment, the threshold level at which the switching control block 206 responds is determined by a transistor (such as a MOSFET transistor Q3 in FIG. 5) at a front end of the switching control block 206. For instance, a 1V or less voltage level may be provided in order to turn off the transistor Q3. Thus, if the value of the resistor R6 is 4.5 k ohms and the value of the resistor R7 is 500 ohms, the output voltage on the connection 216 is 0.5V, giving a 100% margin.

Based on Equation (1) above for a t=50 μs delay (e.g., 10 AC bus cycles), the value of τ is 31 μs=−t/ln(1V/5V) and the value of the capacitor C2 is 62 nF. Therefore in summary, when the AC voltage on the bus 122 falls below 80% of the nominal voltage level, the output of the comparator A is low. The timer 218 then provides a delay before the output voltage on the connection 216 transitions to a low level.

In a situation where the determined voltage level of the bus 122 falls below 20% of the nominal AC bus voltage, the output of the comparator B transitions to a low level. The timer 218 in such a situation is bypassed, the output voltage on the connection 216 immediately transitions to the low level or some other change in state absent a delay.

Figure 5:
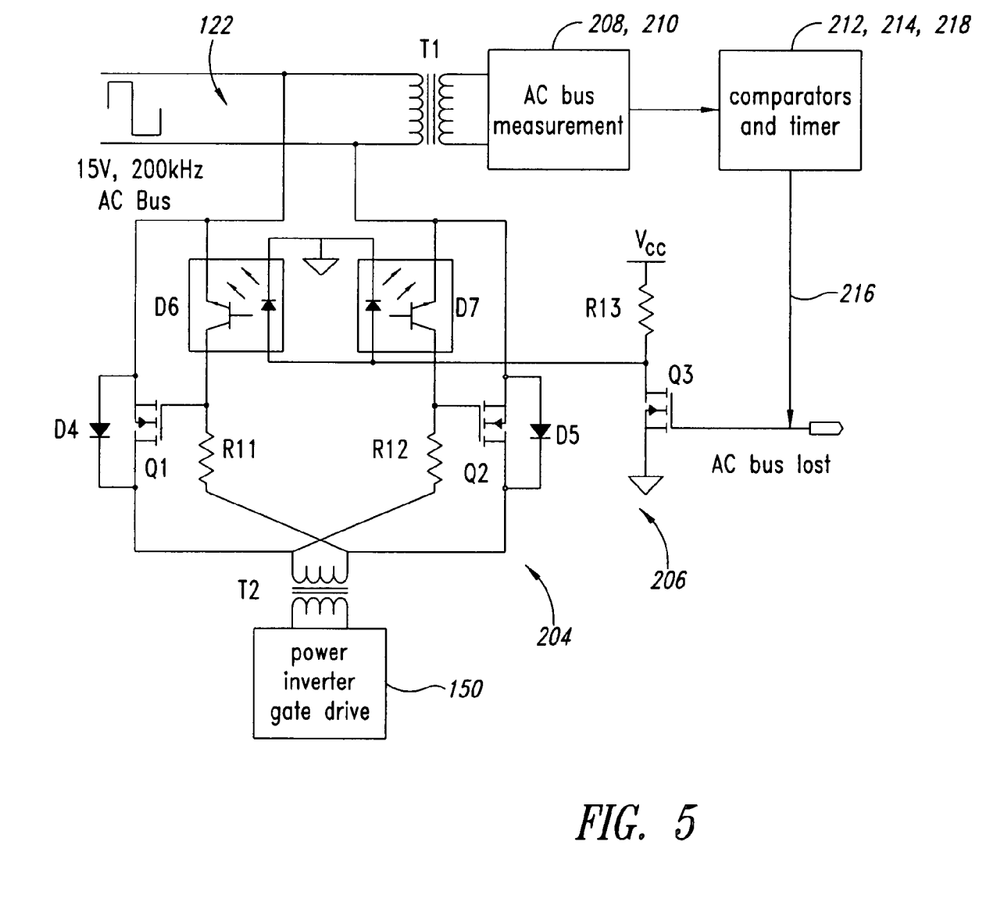
FIG. 5 is a schematic diagram of an embodiment of a switching control circuit of the module of FIG. 1.

The schematic diagram of FIG. 5 shows in more detail an embodiment of the switching control block 206 of FIG. 2 that receives the AC bus lost signal from FIG. 4. FIG. 5 also shows in more detail an embodiment of the switching circuit 204 that is controlled by the switching control block 206.

An embodiment of the switching control block 206 comprises the transistor Q3 (or other active device) having a first terminal coupled to the connection 216 to receive the output voltage (i.e., control signal) thereon. A second terminal of the transistor Q3 is coupled to a first terminal of a resistor R13, which has in turn a second terminal coupled to the voltage supply Vcc. The first terminal of the resistor R13 is coupled to transistor control circuits D6 and D7. In an embodiment, the transistor control circuits D6 and D7 comprise a pair of optical circuits each having an input diode and an output transistor.

The switching circuit 204 comprises transistors Q1 and Q2, and diodes D4 and D5 respectively coupled to the transistors Q1 and Q2. A pair of resistors R11 and R12 controls the transistors Q1 and Q2. Under normal operating conditions, the transistors Q1 and Q2 and the diodes D4 and D5 provide a path between the AC voltage from the bus 122 and the power inverter gate drive unit 150, where the diodes of the transistor control circuits D6 and D7 are in a non-conductive state.

To further illustrate operation of the switching circuit 204 under normal operating conditions, one of the two electric paths is in a counter-clockwise direction from the AC bus 122 to the diode D4, to the transformer T2, to the transistor Q2, and then back to the bus 122. In this situation, the resistor R12 pulls up a gate of the transistor Q2 to a high level, thereby making the transistor Q2 conductive.

When the AC voltage on the bus 122 changes polarity, the electric path is in the clockwise direction. In this situation, the transistor Q2 turns off, and the transistor Q1 becomes conductive.

In an embodiment, the two transistors Q1 and Q2 are further respectively controlled by the two transistor control circuits D6 and D7.

When the output voltage on the connection 216 transitions from high to low (such as when the AC bus voltage falls below 80% and/or falls below 20% of the nominal AC bus voltage), the transistor Q3 turns OFF. The diodes of the transistor control circuits D6 and D7 become conductive through the resistor R13. As a result, the output transistors of the transistor control circuits D6 and D7 will short the gate-drain terminals of the transistors Q1 and Q2 together, thereby preventing or otherwise disabling the transistors Q1 and Q2 from further switching. Thus, the AC bus voltage on the bus 122 is isolated from the input of the inverter gate drive unit 150.

In one embodiment, the AC bus lost signal is provided on the connection 216 at the input terminal of the transistor Q3. That is, the output voltage from the circuit of FIG. 4 on the connection 216 can serve as the AC bus lost signal in such an embodiment. The AC bus lost signal can be provided to the system controller 114 (or other component of the system 100), so that additional protective actions may be taken, such as those described above with respect to the HVDC bus 112.

Figure 6:
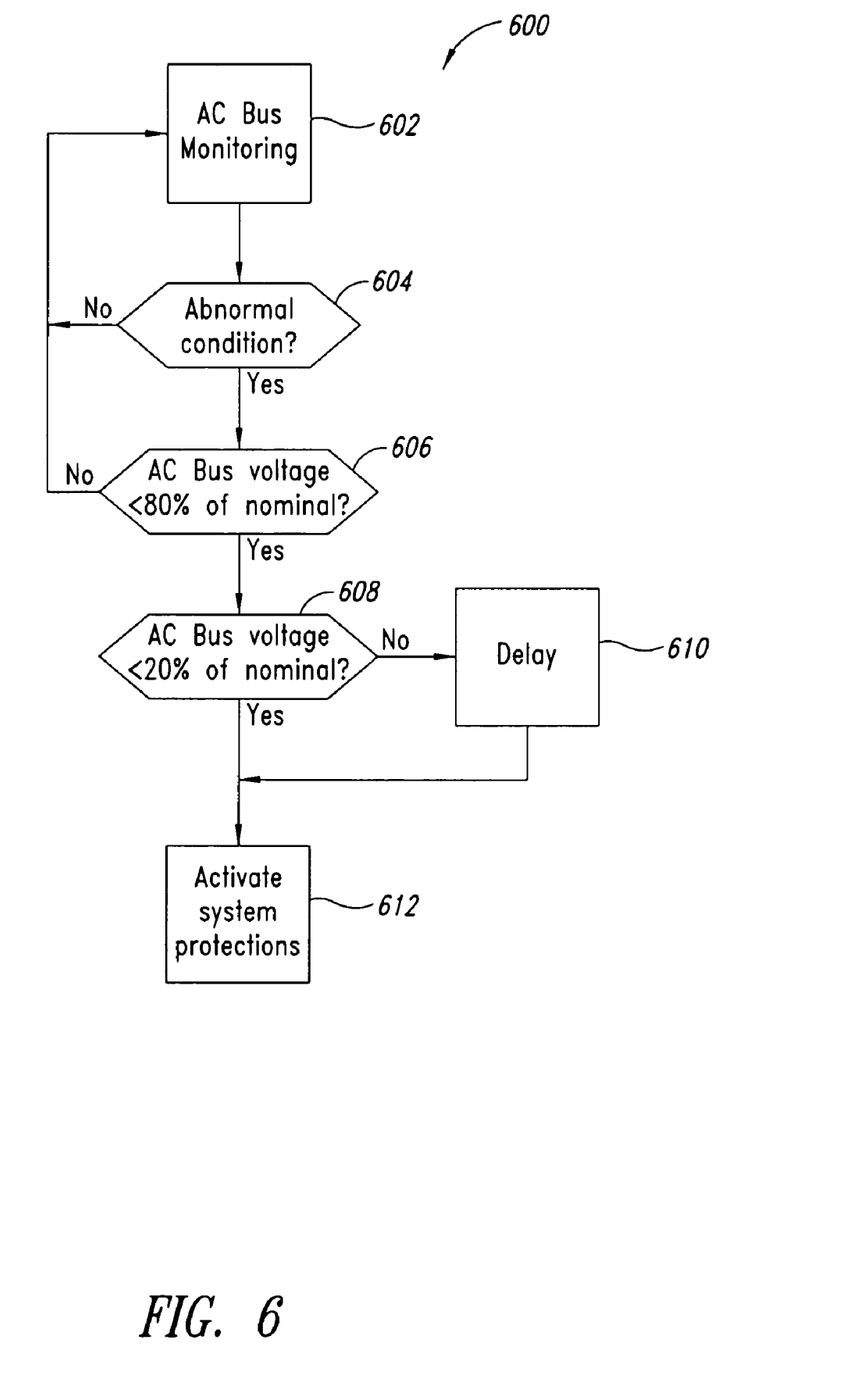
FIG. 6 is a flowchart of an embodiment of a method to detect a malfunction in the AC bus and to protect the power system of FIG. 1 from the malfunction.

FIG. 6 is a flowchart of a method 600 for determining whether an abnormal condition exists on the AC bus 122 (such as a reduction, complete loss, increase, or other change in AC voltage level) and for taking corrective action. In one embodiment, the operations depicted in the method 600 correspond to the operations performed by the circuits shown and described with respect to FIGS. 2-5 above. In another embodiment, some operations of the method 600 may be implemented in software or other machine-readable instruction stored on a machine-readable medium, such as the machine-readable instructions 144 in the storage medium 146. For instance, software processes may be used to determine the nature of the AC voltage on the bus 122 and then used by the system controller 114 to take the appropriate corrective action, such as turning off switching or other action.

The various operations depicted in the method 600 need not occur in the exact order shown. Moreover, certain operations can be modified, added, removed, combined, or any combination thereof.

Beginning at a block 602, the method 600 monitors the condition of the AC bus 122 to determine if there are any abnormalities. For example, if the house keeping power supply 116 has failed or is low in voltage, then the AC voltage on the bus 122 may be below the nominal level. In an embodiment, the condition of the bus 122, such as loss or reduction of AC bus voltage, may be monitored using the rectifier 208 and voltage divider 210 of FIG. 3.

If no abnormal condition is detected at a block 604, then normal operation of the AC bus continues. As explained above, this operation involves providing the AC voltage from the bus 122 to the inverter gate drive unit 150 so that the switches of the inverter 108 can operate to provide AC power to the electric motor 102. Under such normal operating conditions, the voltage level on the connection 216 may be high, for instance.

If the abnormal condition of the bus 122 is detected at a block 604, then the method 600 determines at a block 606 whether the determined AC voltage of the bus 122, for example, is below a first voltage level, or otherwise determines a degree of change of the AC voltage on the bus 122. Examples described above set this first level at 80% of the nominal AC voltage on the bus 122, and it is appreciated that this voltage level is merely illustrative and other voltage levels may be set. If the determined AC voltage of the bus 122 is not below this first voltage level, then the normal operation of the AC bus continues at the block 602, as described above.

If the method 600 determines at the block 606 that the determined AC voltage of the bus 122 is below the first voltage level, then the method 600 determines at a block 608 whether the determined AC voltage of the bus 122, for example, is below a second voltage level, or otherwise determines a degree of change of the AC voltage on the bus 122. Examples described above set this second voltage level at 20% of the nominal AC voltage on the bus 122, and it is appreciated that this voltage level is merely illustrative and other voltage levels may be set.

If the determined AC voltage of the bus 122 is not below this second voltage level, then the timer 218 introduces a delay at a block 610. After expiration of the delay, various actions to protect the system may be activated at a block 612. If the determined AC voltage of the bus 122 is calculated to be below this second voltage level at the block 608, then the protective actions at the block 612 may be activated immediately, bypassing the delay timer at the block 610.

At the block 612, the switching control block 206 causes the switching control circuit 204 to isolate the bus 122 from the inverter gate drive unit 150, for instance. Other corrective actions may be taken at the block 612. For instance, the backup power supply 120 may be brought online by the system controller 114 to provide the AC power to the HKPS 116, if the HKPS 116 is low on power. The AC bus lost signal may also be generated and provided to the system controller 114 or other component of the system 100 when the bus 122 is isolated, so that additional protective actions based on the voltage level of the HVDC bus 112 can be taken.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

As yet another example, the inverter 108 has been described in embodiments above as a type of power transformation device that can be implemented in the power system 100. It is appreciated that in other embodiments, other types of power transformation devices may be implemented in the power system 100. Examples of such other power transformation devices include, but are not limited to, DC/DC step up/down converters, AC/DC rectifiers, and the like.

As still another example, embodiments have been described above as making certain decisions and/or taking certain actions based on conditional transitions of signals from high to low levels. It is appreciated that such descriptions of voltage levels and conditional transitions are merely illustrative. Other embodiments can be provided that operate on transitions of signals from low to high levels, for example, or based on voltage levels for Vcc, the AC bus voltage, or other values that may be different than those illustratively described above.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A power system, comprising:
   a first power supply to provide DC power to a direct current (DC) bus;
   an inverter coupled to the first power supply to transform the DC power provided by the first power supply to a form that can be used by an electrical load;
   a second power supply coupled to an Alternating Current (AC) bus to provide a signal on the AC bus;
   a switching control unit to operate on the AC bus signal to obtain a switched signal;
   an inverter drive unit coupled to the AC bus to receive the switched signal and coupled to the inverter to provide switched signals to the inverter to control transformation of the DC power provided by the first power supply; and
   a module coupled to the AC bus to detect a particular condition of the AC bus, and if the condition is detected, to send a control signal to decouple the inverter drive unit from the AC bus.

2. The power system of claim 1 wherein the detected condition comprises a reduction in a voltage level on the bus.

3. The power system of claim 2 wherein the module comprises:
   a voltage divider coupled to the bus to generate an output voltage; and
   at least one comparator circuit coupled to the voltage divider to receive the output voltage and to compare the output voltage with at least one reference voltage level,
   wherein if the output voltage is above the at least one reference voltage level, the control signal has a first value that allows the inverter drive unit to be coupled to the bus, and
   wherein if the output voltage is below the at least one reference voltage level, the control signal has a second value that initiates decoupling of the inverter drive unit from the bus.

4. The power system of claim 3 wherein the at least one reference voltage level comprises first and second voltage levels, and wherein the at least one comparator circuit comprises:
   a first comparator coupled to the voltage divider to receive the output voltage therefrom and to compare the output voltage with the first voltage level;
   a second comparator coupled to the voltage divider to receive the output voltage therefrom and to compare the output voltage with the second voltage level; and
   a timer coupled to the first comparator,
   wherein if the output voltage compared by the first comparator to the first voltage level is below the first voltage level and above the second voltage level, the timer is coupled to provide a delay before the control signal attains the second value to initiate decoupling of the inverter drive unit from the bus, and
   wherein if the output voltage compared by the second comparator to the second voltage level is below the second voltage level, the control signal attains the second value to initiate decoupling of the inverter drive unit from the bus absent the delay from the timer.

5. The power system of claim 1 wherein the first power supply comprises a fuel cell system, and the electrical load comprises an electrical motor.

6. An apparatus to detect an abnormal condition on a control bus that receives a control bus signal from a house keeping power supply and to provide protection to a power system providing power through a power bus if the abnormal condition is detected, the apparatus comprising:
   a voltage determination circuit coupled to the control bus to determine a level of the control bus signal and to provide an output signal that represents the determined level of the control bus signal;
   comparator circuitry coupled to the voltage determination circuit to compare the output signal with at least one reference voltage level and to generate a control signal having first and second states that are based on the comparison of the output signal with the least one reference voltage level; and
   control circuitry coupled to the comparator circuitry to receive the control signal, the control circuitry being responsive to the control signal to provide the control bus signal to the power system if the control signal has the first state and being responsive to the control signal to isolate the control bus from the power system if the control signal has the second state.

7. The apparatus of claim 6 wherein the voltage determination circuit comprises:
   a rectifier circuit coupled to the control bus to rectify and filter the bus signal; and
   a voltage divider circuit coupled to the rectifier circuit to generate the output signal from an output of the rectifier circuit.

8. The apparatus of claim 6 wherein the at least one reference voltage level comprises first and second voltage levels, and wherein the comparator circuitry comprises:
   a first comparator circuit coupled to the voltage determination circuit to receive the output voltage therefrom and to compare the output voltage with the first voltage level;
   a second comparator circuit coupled to the voltage determination circuit to receive the output voltage therefrom and to compare the output voltage with the second voltage level; and
   a timer coupled to the first comparator circuit,
   wherein if the output voltage compared by the first comparator circuit to the first voltage level is below the first voltage level and above the second voltage level, the timer is coupled to provide a delay before the control signal changes to the second state, and
   wherein if the output voltage compared by the second comparator circuit to the second voltage level is below the second voltage level, the control signal changes the second state in a manner that bypasses the timer.

9. The apparatus of claim 8 wherein the first voltage level comprises 80% of a nominal voltage level on the bus, and wherein the second voltage level comprises 20% of the nominal voltage level on the control bus.

10. The apparatus of claim 8 wherein the timer comprises a capacitor coupled to discharge through a resistor, a time of the discharge corresponding to a length of the delay.

11. The apparatus of claim 6 wherein the control circuitry comprises:
   at least one switch coupled to the control bus to provide the control bus signal, as switched by the at least one switch, to a component of the power system; and an active device coupled to the comparator circuitry to receive the control signal therefrom and coupled to the at least one switch, the active device having a first conductive state corresponding to the first state of the control signal that permits the at least one switch to continue to switch the control bus signal, the active device having a second conductive state corresponding to the second state of the control signal that disables the at least one switch from switching the control bus signal.

12. A method for a power system, the method comprising:
providing power from a first power supply to a power bus;
transforming the power provided by the first power supply to the power bus to a form that can be used by an electrical load;
providing a signal to a control bus from a second power supply;
operating on the control bus signal to obtain a switched signal;
enabling transformation of the power provided by the first power supply to the power bus using at least the switched signal from the control bus; and
monitoring for a particular condition on the control bus, and if the particular condition is detected, providing a control signal to deactivate the operating on the control bus signal to obtain the switched signal.

13. The method of claim 12 wherein monitoring for the condition on the control bus comprises monitoring for a change in voltage level on the control bus.

14. The method of claim 13 wherein monitoring the change in voltage level on the control bus comprises generating an output signal that is indicative of whether the voltage level on the control bus had decreased, wherein providing the control signal comprises:
comparing the output voltage with a first voltage level;
comparing the output voltage with a second voltage level;
if the output voltage is below the first voltage level and above the second voltage level, providing a delay before the control signal attains a state to initiate deactivation of the operating on the control bus signal to obtain the switched signal, and
if the output voltage is below the second voltage level, transitioning the control signal to the second state to initiate the deactivation of the operating on the bus signal to obtain the switched signal, absent the delay.

15. An article of manufacture, comprising:
a machine-readable medium having instructions stored thereon to cause a processor to detect an abnormal condition on a control bus that receives a signal from a house keeping power supply and to provide protection to a power system supplying power to a power bus if the abnormal condition is detected, by:
determining a level of the control bus signal and to provide an output that represents the determined level of the control bus signal;
comparing the output with at least one reference value and generating an indication of first and second states that are based on the comparison of the output with the least one reference value; and
controlling a component of the power system to provide the control bus signal to the power system if the indication has the first state and to isolate the control bus from the power system if the indication has the second state.

16. The article of manufacture of claim 15 wherein the at least one reference value comprises first and second values, and wherein the instructions to compare the output with the at least one reference value comprises:
comparing the output with the first value;
comparing the output with the second value;
delaying transition of the indication from the first state to the second state if the output is below the first value and above the second value; and
transitioning the indication, in a manner that bypasses the delay, from the first state to the second state if the output is below the second value.

17. The article of manufacture of claim 15 wherein the instructions to control the component of the power system to isolate the control bus from the power system if the indication has the second state includes instructions to deactivate switching of an inverter that transforms power from a first form to a second form usable by an electric load.

18. A power system, comprising:
main power supply means for providing power to a power bus having a first form;
means for transforming the power on the power bus in the first form to a second form;
house keeping power supply means for providing a signal to a control bus;
means for operating on the control bus signal to obtain a switched signal;
means for enabling the transformation of the power on the power bus using at least the switched signal of the control bus; and
means for monitoring for a condition on the control bus, and means for providing a control signal to deactivate the means for operating on the control bus signal to obtain the switched signal if the condition is detected, the means for providing the control bus signal including means for changing a state of the control bus signal dependent upon a degree of the detected condition.

19. The power system of claim 18 wherein the condition comprises a reduction of a characteristic of the bus signal, the means for changing the state of the control signal including means for delaying a change of the state of the control signal based on an amount of the reduction of the characteristic of the control signal.

20. The power system of claim 18 wherein the characteristic of the control bus signal comprises a voltage level.

21. The power system of claim 18, further comprising:
at least one additional power supply means to provide power to at least one component of the system; and
controller means for controlling operation of the means for transforming.

22. A power system that powers an electric machine, the power system comprising:
a power source providing power to a power bus;
a converter coupled to the power source and operable to convert power from the power source to a form that can be used to drive the electric machine;
a house keeping power supply coupled to the converter and operable to supply a signal on a control bus to enable operation of at least the converter; and
a module coupled to the house keeping power supply and operable to monitor the signal on the control bus for at least one abnormality, and further operable to isolate the converter from the signal on the control bus if the at least one abnormality is detected in the signal.

23. The power system of claim 22 wherein the at least one detected abnormality comprises a reduction in a voltage level of the signal on the control bus.

24. The power system of claim 22 wherein the module is further operable to provide a delay in isolation of the converter from the signal on the control bus if the at least one detected abnormality meets at least one condition.

25. The power system of claim 22, further comprising:
the control bus coupled to the house keeping power supply and operable carry the signal on t e control bus; and
a drive unit coupled to the converter to control operation of the converter, wherein the module is operable to isolate the converter from the signal on the control bus by decoupling the drive unit from the control bus.

* * * * *